United States Patent [19]

Ishikawa

[11] Patent Number: 5,164,573
[45] Date of Patent: Nov. 17, 1992

[54] OPTICAL READING DEVICE
[75] Inventor: Hiroshi Ishikawa, Furukawa, Japan
[73] Assignee: Alps Electric Co., Ltd., Tokyo, Japan
[21] Appl. No.: 332,639
[22] Filed: Mar. 31, 1989
[30] Foreign Application Priority Data
  Jun. 28, 1988 [JP] Japan .................. 63-84471[U]
[51] Int. Cl.[5] .......................... G06K 7/10; G06K 7/14
[52] U.S. Cl. ...................................... 235/454; 235/462; 235/472
[58] Field of Search .............. 369/112, 45; 235/472, 235/462, 454; 250/546, 568, 569

[56] References Cited

U.S. PATENT DOCUMENTS

| | | | |
|---|---|---|---|
| 4,143,809 | 3/1979 | Uebbing et al. | 250/566 |
| 4,182,956 | 1/1980 | Funk, Jr. et al. | 250/568 |
| 4,528,444 | 7/1985 | Hara et al. | 235/472 |
| 4,578,751 | 3/1986 | Williams | 235/472 |
| 4,641,017 | 2/1987 | Lopata | 235/454 |
| 4,678,288 | 7/1987 | Lonsdale et al. | 235/472 |
| 4,742,214 | 5/1988 | Kobayashi | 235/454 |

FOREIGN PATENT DOCUMENTS 62-2689  5/1979  Japan .

OTHER PUBLICATIONS

Francis A. Jenkins and H. E. White, *Fundamentals of Optics*, McGraw Hill, New York, 1976, pp.162-165.

*Primary Examiner*—Stuart S. Levy
*Assistant Examiner*—Christopher R. Glembocki
*Attorney, Agent, or Firm*—Guy W. Shoup; David W. Heid; B. Noel Kivlin

[57] ABSTRACT

An optical reading device is disclosed which comprises: a light emitting element for emitting light to irradiate a medium; a light receiving element for carrying out the light-electro conversion of the reflected light from the said medium which is irradiated from the light emitting element; a light receiving side lens for focussing the light reflected from the medium onto the light receiving element and having an optical axis aligned with the optical axis of the light receiving element; and a light emitting side lens having a larger numerical aperture than that of the said light receiving side lens, and for focussing the light from the said light emitting element onto the said medium, and also having an optical axis deviatingly disposed from the optical axis of the light receiving element; characterized in that the optical axis of the light emitting side lens is disposed within the focal zone on the detection surface of the medium, that is, within the focal zone of the light coming from the light emitting element through the light emitting side lens. The optical reading device thus constituted will not be influenced much by the forward reflection of light, the setting range of the resolving power will be made free, the focal depth will become deeper, and the reading probability will be improved.

3 Claims, 8 Drawing Sheets

OPTICAL READING DEVICE

FIELD OF THE INVENTION

The present invention relates to an optical reading device which reads optical marks appearing on the medium, and particularly to an optical reading device which prevents erroneous detections due to forward reflections and has a high resolving capability for achieving an improved reading probability with a deep focal depth.

BACKGROUND OF THE INVENTION

A bar code reader which is an optical reading device is disclosed for example in Japanese Utility Publication No. Sho-62-2,689, and the constitution of such a device of the prior art will now be described with reference to FIGS. 10 to 19 of the attached drawings.

FIG. 10 is a sectional view showing the constitution of an optical reading device of the prior art. FIG. 11 is a sectional view of the critical portion of the device of FIG. 10 showing the detecting mechanism. FIG. 12 shows the reading spot of the device of FIG. 11. FIG. 13 is a sectional view of the critical portion of the device of FIG. 11 showing a state in which the detection is made from a separated position. FIG. 14 shows the reading spot of the device of FIG. 13. FIG. 15 is a plan view of the critical portion of the lens 6 of FIG. 10. FIG. 16A is a plan view of bar codes recorded in the media. FIG. 17 is a sectional view showing the state of the bars of FIG. 16. FIG. 17 is a sectional view showing the indicating state of the spaces of FIGS. 16. FIG. 19 is a wave form diagram showing an undesirable detected signals.

A metal body 9 is fixedly installed within a pen-shaped case 1, and one end of the metal body 9 is closed with a base plate 4 which is conductive at its one end. On the inner face of this base plate 4, there are fixedly installed a light emitting element 2 composed of an LED and a light receiving element 3 composed of a photo diode through a die bonding. Terminals 13, 14 which are respectively wire-bonded to the light emitting element 2 and to the light receiving element 3 are projected from the opposite side of the face where the light emitting element 2 and the light receiving element 3 are attached. Thus the base plate 4, the light emitting and receiving elements 2, 3 and the terminals 13, 14 arranged as described above make up a reflective photo sensor 16. This reflective photo sensor 16 is placed as if it is exerting pressure toward the leading end of the pen-shaped case 1 through an insulating member which is made of a high thermal concutivity material such as alumina, and which is installed on the side where the terminals 13, 14 are projected. The other end of the metal body 9 opposite from the side where the base plate 4 is installed is provided with an opening 9a with a predetermined inner diameter, through which light can pass, and a lens 6 made of a transparent plastic member is disposed between the said opening 9a and the light emitting and receiving elements 2, 3. The lens 6 consists of a light emitting side lens 7 and a light receiving side lens 8, the former being for focussing the light emitted by the light emitting element 2 discontinuously to a detection face 10 of the medium 5 in the form of bars 11, while the latter being for focussing to the light receiving element 3 the incoming light reflected from the detection face 10. These light emitting and receiving lenses 7, 8 are fittingly installed within the inside of the metal body 9, and are fixedly positioned by means of a supporting portion 6a. The side of the base plate 4 where the light emitting and receiving elements 2, 3 are located, and which is disposed adjacently to the supporting portion 6a abuts to a metal plate 9b which is in turn attached to the metal body 9 by means of an adhesive layer 9d, thereby fixedly securing the positional relationship between the lens 6 and the light emitting and receiving elements 2, 3.

Both the light emitting side lens 7 and the light receiving side lens 8 are non-spherical lenses, and as shown by the plan view of FIG. 15 where the critical portion of the lens 6 is illustrated, the light emitting side lens 7 and the light receiving side lens 8 are partly overlapping each other, and therefore, a pair of optical axes a, b which are the lines connecting the centres of the refractive curved surfaces of the light emitting side lens 7 and the light receiving side lens 8 will cross each other at a vicinity of the reading spot on the detection face 10 as shown in FIG. 10, in such a manner that the light emitting element 2 is located on the extended line of the optical axis a, and the light receiving element 3 is located on the extended line of the optical axis b.

The beam range transmittable from the light receiving side lens 8 to the light receiving element 3 falls within the angle indicated by the dotted lines b2 and b3 which is the angle of the aperture diaphragm for restricting the light beam, and which is shown in FIG. 10 by the dotted lines b2 and b3, it being based on the flat peripheral portion of the light receiving lens 8 in which a part of the circular shape of the reflected light beam incoming from the detection surface 10 to the light receiving lens 8 is fall out, or biased on the flat shape of the convertible zone (convertible from light to electric signal) of the circular light receiving element. Within the aperture diaphragm formed by the angle between b2 and b3, the angular difference $\theta b$ between the optical axis b of the light receiving side lens 8 and the maximum angle b2 crossing the optical axis b is determined by the radial distance d between the optical axis of the said lens and the outmost periphery of the lens, the distance 1 between the outmost periphery of the lens and the interesecting point of the optical axis of the lens at the angle of the aperture diaphragm, and the formula 1 as indicated below.

$$Sin^{-1}(1/d) = \theta b \text{ (degree)} \qquad (1)$$

The numerical aperture (N.A.) as the indicator of the resolving power of the light receiving side lens 8 based on the angle $\theta b$ is usually set to 0.2–0.4, being determined by the formula 2 as shown below.

$$N.A. = Sin. \theta b \qquad (2)$$

Meanwhile, the range of concerntrating the beam from the light emitting element 2 by the light emitting side lens 7 falls within the angle of the aperture diaphragm formed by the dotted lines a2 and a3, which is the diaphragm restricting the light beam. Within this angle of the aperture diaphragm between the dotted lines a2 and a3, the angular difference $\theta a$ between the optical axis a of the light receiving side lens 8 and the maximum angle a2 crossing the optical axis a of the light receiving side lens is determined by the radial distance d between the optical axis a and the outmost periphery of the lens, the distance 1 between the outmost periphery of the lens and the intersecting point of the optical axis of the lens at the angle of the aperture diaphragm, and the formula 3 below.

$$Sin^{-1}.1/d = \theta a \text{ (degree)} \quad (3)$$

The numerical aperture N.A. as the indicator of the resolving power of the light emitting side lens 8 based on θa is usually set to 0.1-0.4 as determined by the formula 4 below.

$$N.A. = Sin.\theta a \quad (4)$$

The numerical apertures of the two lenses 7, 8 of this optical reading device are set such that they seem to correspond each other.

The numerical apertures of the two lenses 7, 8 of this optical reading device are set such that they seem to correspond each other.

The narrowing leading end of the pen-shaped case 1, which faces the lens 6, is provided with an aperture 15 of a cylindrical shape for passing the light beams, and through this aperture 15, the adjacently positioned detection surface of the medium 5 sends reflected electrical signal output to the light receiving element 3, the characteristics of the said signal output depending on the light absorbing bars 11 and the light reflecting spaces 12 as shown in FIG. 16. To show the reading positional relationship, the angle between the detection surface 10 of the medium 5 and the axis 0 indicated by a long dotted line which is common to both the reflective photo sensor 16 and the aperture 15 is given 90 degrees in FIG. 10. However, in practical uses, the angle is undulated to 45 degrees (not uniform), and the scanning detection is carried out with such an angle.

The light emitted by the light emitting element 2 is impressed to the reading spot on the detection surface 10 of the medium 5 after being focussed by the light emitting side lens 7. As shown in FIG. 16, since the bars 11 and the spaces 12 are indicated in discontinuous optical codes, when the reading spot is at a bar 11, small amount of reflected light can be obtained, because a large amount of light is absorbed at the bar 11, while, when the reading spot is at a space 12, a large amount of reflected light is obtained because a small amount of light is absorbed at the space 12. A part of this reflected light is focussed by the light receiving side lens 8 to be transmitted to the light receiving element 3 and ultimately to be converted to electric signals.

Thus the bar codes 11, 12 which are provided on the detection surface 10 of the medium 5 are read by the optical reading device, and the high and low voltage levels corresponding to a bar 11 and a space 12 form a pair respectively, these being read by means of a decoder as the time information.

In the conventional optical reading device as described above, if the axis 0 of the reflective photo sensor 16 is directed perpendicularly to the detection surface 10, the output voltages of the space and the bar are reversed each other due to the forward reflections, thereby easily causing reading errors. Within the light beam irradiated onto the detection surface 10 which is perpendicularly disposed to the axis of the photo sensor, a certain light a1 with an angle θ is reflected onto the detection surface 10 and at the opposite side around the axis 0, forwardly reflected lights b1 with the same angle θ is delivered to the light receiving element 3 proportionately more, thereby making the reading errors be apt to occur.

When reading the optical codes which are the bar codes in the form of the light absorbing bar 11 and the light reflecting space 12 as shown in FIG. 16A, if the above mentioned case is encountered, for example, the detection voltage from the light receiving element for the space 12 will shown always higher output wave form compared with the detection result of the bar 11, as shown in FIG. 16B. But compared with the surface condition of the bar 11 as shown in the enlarged view of FIG. 17, the surface condition of the space 12 as shown in the enlarged view of FIG. 18 shows more unevenness (irregularity) only on the portion where the light absorbing ink is not coated.

Here, within the reflected beam from the detection surface 10 directed perpendicularly to the axis 0, even if a part of the light which is not absorbed but randomly reflected does not reach the light emitting element 3, the proportion of the forwardly reflected light which has the same incident angle and reflecting angle such as light a1 and b1 is increased, and therefore, the wave forms of the detection signals corresponding to the light absorbing bar 11 having a small degree of irregularity and the wave forms of the detection signals corresponding to the light reflecting space 12 will become such that the light absorbing rate at the inked portion comes below such that absorbing rate at the space 12 shown in FIG. 19 in some zone, resulting in that the wave form of the output voltage is disturbed, thereby causing erroneous judgement of the width.

Accordingly, in an optical reading device in which the numerical apertures for the light emitting side lens 7 and the light receiving side lens 8 are approximately same each other, the proportion of the forwardly reflected light amount having the reflection angle θ and reaching the light receiving element 3 to the light amount irradiated to the reading spot X with an incident angle θ becomes large. Therefore, particularly, due to the degree of the surface unevenness of the light absorbing face or the medium, and due to the variations of the direction of the optical reading device, the detection output from the light reflection portion and the light absorbing portion partially reverses each other, thereby increasing the probability of causing judgement errors.

As a means for preventing the errors due to this forward reflection, the complementation of the non-spherical surface of the light emitting side lens 7 is made imperfectly. For example, it may be conceived that, with a short distance between the lens and the light source, the spherical aberration due to the difference between the distance from the centre of the lens to the light source and the distance from the periphery of the lens to the light source is made large, thereby reducing the component of the passing light by making it reflected to the reading spot X. But in this case, the light from the light emitting element 2 equivocates the irradiated spot at the reading spot X, and therefore, the desired amount of reflected light can not be obtained, resulting in that the detectable resolving function of the optical reading device is lowered.

On the other hand, if the distances of the detection surface 10 of the medium 5 and the optical reading device are increased from the positions of FIG. 10 and 11 to the position of FIG. 13, the irradiated spot α of the light from the light emitting element 2 deviates from the detection spot β on the detection surface 10 as shown in FIG. 14, unlike that of FIG. 12. This phenomenon is mainly due to the fact that the optical axis a of the light emitting side lens 7 and the optical axis b of the light receiving side lens 8 are made to intersect at the reading spot near the aperture 15, and the light emitting and receiving elements 2, 3 are disposed on the said optical axes respectively, resulting in that the comatic aberration which is a non-objective deviation of the image formed at the focal spot is extremely reduced. In an optical reading device in which this comatic aberration is inhibited, if the detection surface 10 is separated away from the reading spot which is also the intersecting point of the optical axes a, b, the irradiated spot α is deviated from the detection zone β as well as the illumination within the irradiated spot being lowered, thereby drastically decreasing the light-electro conversion within the light receiving element 3 and ultimately lowering the detection capability. If the comatic aberration or the spherical aberration is further inhibited, the irradiated spot α is properly positioned at the reading spot X as shown in FIG. 12, but as the irradiated spot is gradually deviated from the reading spot X as shown in FIG. 14, the illumination is gradually weakened although the concentration is still kept, bringing the effect that a larger illumination is made, thereby lowering the resolving power for the minimum readable interval of the light absorbing pattern and the light reflecting pattern on the detection surface 10 of the medium 5. Thus in an optical reading device, only when more than a set value of a focal depth W (for example, about 1.2 mm) which is the readable limit is secured after deviation from the reading spot X, the operation of detection is assured.

But the conventional optical reading devices are constituted such that the same light emitting and light receiving side lens axes are made to intersect each other at a vicinity of the reading spot, and the light emitting and light receiving elements are disposed on the said optical axes respectively, resulting in that, if the irradiated spot α is equivocated in order to prevent reading errors due to forward reflections, the resolving power is lowered to ultimately lower the reading probability.

SUMMARY OF THE INVENTION

Therefore it is the object of the present invention to provide an optical reading device in which the influence of the forward reflection is inhibited, the set range of the resolving function is made free, and the reading probaility is high with a deep focal depth.

In achieving the above mentioned object, the device of the present invention comprises: a light emitting element 2 for emitting light to irradiate the medium 5; a light receiving element 3 for carrying out the light-electro conversion of the reflected light from the said medium 5 which is irradiated from the light emitting element 2; a light receiving side lens 8 which focuses the reflected light from the medium 5 onto the light receiving element 3, and in which the optical axis b is aligned with the axis of the pertinent light receiving element 3; and a light emitting side lens 7 which has larger numerical apertures N.A. than the numerical apertures of the said light receiving side lens 8, and focuses the light from the said light emitting element 2 onto the said medium 5, and in which the said light emitting element 2 is deviatingly disposed from the optical axis toward the opposite side from the position of the said light receiving element 3; characterized in that the optical axis b of the said light receiving side lens 8 is disposed within the focal zone α on the detection surface 10 of the medium 5, that is, within the focal zone α of the light coming from the said light emitting element 2 through the light emitting side lens 7.

The device according to the present invention constituted as described above will be operated as follows. By means of the light emitting side lens 7, the optical axis a of which is deviatingly disposed relative to the light emitting element 2, the forwardly reflecting component of the light coming from the light emitting element 2 is reduced, and this light is efficiently focussed onto the medium 5. Further, the detection is made through the light receiving side lens 8 which has smaller numerical apertures compared with the numerical apertures of the light emitting side lens 7, and in which the optical axis b is aligned with the light receiving element 3. Therefore, a practically useful optical reading device is provided in which the change of the detecting position does not give much influence to the amount of the detected light, the setting range of the resolving power is very wide, the focal depth W is very deep, and the reading errors due to the forward reflections are very low.

BRIEF DESCRIPTION OF THE DRAWINGS

The above object, and other advantages of the present invention will become more apparent by describing in detail the preferred embodiments of the present invention with reference to the attached drawings in which.

DESCRIPTION OF THE PREFERRED EMBODIMENTS

Figure 1:
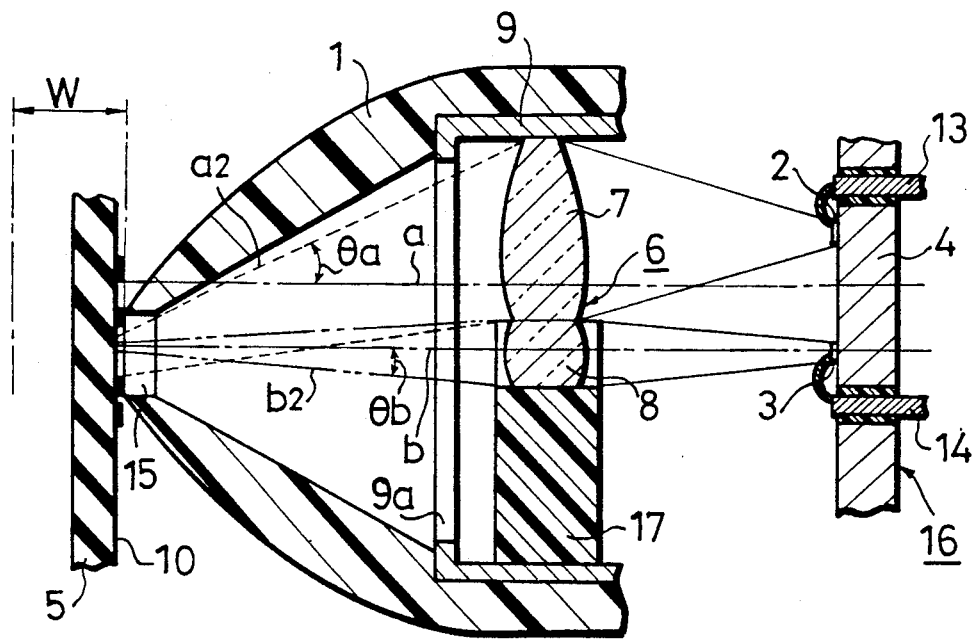
FIG. 1 is a sectional view of the critical portion of the first embodiment of the optical reading device according to the present invention.

Now the preferred embodiment of the present invention will be described referring to FIGS. 1 to 9. The parts which are same as those already described with reference to FIGS. 10 to 19 will be designated by the same reference numbers, and detailed descriptions for the said parts will be omitted.

The first embodiment of the present invention will be described referring to FIGS. 1, 3 to 7, and 9. The first embodiment is constituted such that a case 1 of the optical reading device accommodates a tubular body 9 which in turn accommodates a lens 6 consisting of separate light emitting and light receiving side lenses 7, 8, the lens 6 facing a reflecting type photo sensor 16. Between the lens 6 of the tubular body 9 and the aperture, there is provided an aperture portion 9a for passing the light and for detecting the reflected light from the medium 5. At the side where the aperture portion 9a is provided, there is press-fitted a supporter 17 for securing the lens 6 which is made of a plastic material having a light-shielding property as that of the light emitting and light receiving side lenses 7, 8. A light receiving side lens 8 having a circular circumference is press-fitted into the supporter 17, because the side of the supporter 17 facing to the arc shape is provided with a square-shaped vacant portion, thereby making three places of the sections contact one another. The arc-shaped circumferential portion about a straight line which extends through a point on the circular circumference of the light receiving side lens 8 and the opposite points of the vacant portion of the supporter 17 accommodates a light emitting side lens 7, the lens 7 being press-fitted into the tubular body 9.

Figure 4:
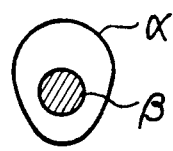
FIG. 4 is a plan view showing the reading spot of FIGS. 1 and 3.

The optical axis a of the light emitting side lens 7 and the optical axis b of the light receiving side lens 8 are arranged in the parallel direction, in such a manner that the light receiving element 3 is disposed on the optical axis b of the light receiving side lens 8, while the light emitting element 2 is deviated from the optical axis a of the light emitting side lens 7 toward the opposite direction from the light receiving element 3. The light emitting side lens 7 is constituted by a spherical lens or non-spherical lens in which the correction of the aberration is incomplete. The light emitting side lens 7 which is seemingly disposed to cause comatic aberrations at least is constituted such that the amount of the forwardly reflected light which is guided from the light emitting side lens 7 through the light receiving side lens 8 to the light receiving element 3 is lowered in its proportion. The numerical apertures N.A. of the light emitting side lens 7 shows an averaged illumination distribution within the range which the narrowed end of egg-shaped contour as shown in FIG. 4 allows. The detection zone B detected by the light receiving element 3 at the time when the irradiated spot $\alpha$ is irradiated wholly encloses the irradiated spot $\alpha$ within its boundary. The circumferential dimension of this detection zone $\beta$ very much depends on the resolving power which is the minimum interval of the readable codes, and therefore, it is made to have a size enough to meet the required size of the medium 5.

Now the function of the device constituted as above will be described. The optical axis a of the light emitting side lens 7 is deviated from the light emitting element 2, and therefore, the beam irradiated on the detection surface 10 becomes a concentrated beam having a comatic aberration from the outside of the aperture 15, and is irradiated with the spot shape $\alpha$ onto the detection surface 10. Due to the comatic aberration, the optical axis a of the light emitting side lens 7 and the principal ray which is the track of the portion having a high illuminance distribution of light emitted from the light emitting element 2 form an angle each other, and therefore, the variation of the illuminance at the irradiated spot $\alpha$ is kept low in the case where the medium 5 is separated from the reading spot X by a predetermined distance. As a means for keeping the said variation low, it can be mentioned that a light emitting side lens 7 which shows incomplete corrections of the spherical aberration may be used, and this is a means for further reduction of the variation of the illuminance. Further, the beam of light irradiated from the light emitting side lens 7 which has two features of the comatic aberration and the spherical aberration incompletely corrected keeps low the variation of the outside diameter of the irradiated spot $\alpha$ in the case where the medium 5 is separated from the reading spot X by a predetermined distance, and the said beam has such characteristics that the probability of the forwardly reflected light to reach the light receiving element 3 after being irradiated to the detection surface 10 is extremely lowered, because the concentration of the illuminance distribution is dispersed.

Figure 3:
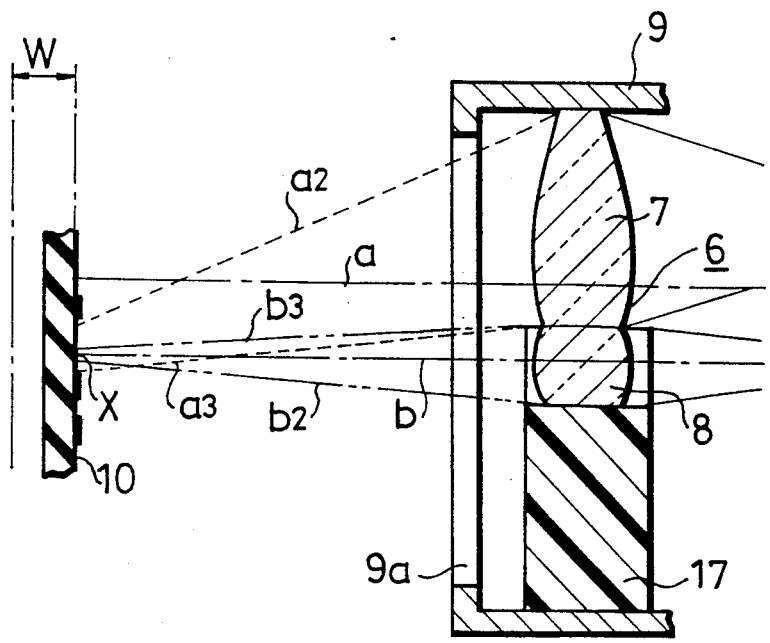
FIG. 3 is a sectional view illustrating the actuation of the critical portion of the device of FIG. 1.
Figure 5:
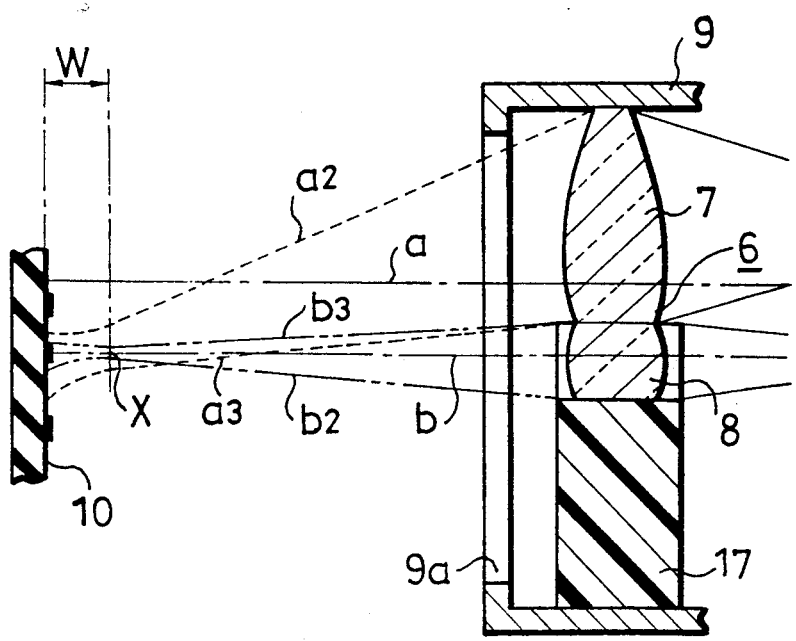
FIG. 5 is a sectional view illustrating the detecting state for a more separated position compared with FIG. 4.
Figure 6:
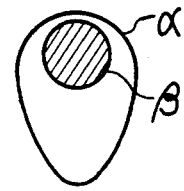
FIG. 6 is a plan view showing the reading spot of FIG. 5.

The light reaching the irradiated spot $\alpha$ after going through the light emitting side lens 7 and after being reflected from the detection surface 10 is transmitted from the irradiated spot $\alpha$ within the detection zone $\beta$ through the light receiving side lens 8 to the light receiving element 3 to undergo the light-electro conversion there. The light reflected from the detection zone $\beta$ to the light receiving element 3 gives enough desired amount of reflected lights after forming proper irradiated spots, even in the case where there is a difference of separation distance of the detection surface 10 (the reading spot X) between FIGS. 3 and 4 and FIGS. 5 and 6, because the numerical aperture N.A. is set smaller in the Tens 8 than in the lens 7. The light reaching the light receiving element 3 has the feature of a dispersed illuminance distribution of the irradiated spot, and therefore, even if the position of the irradiated spot $\alpha$ relative to the detection zone $\beta$ is changed within the range, the variation of the amount of the light reaching the light receiving element 3 is kept low in the case where the reading is made on a detection surface having the same reflective rate. To mention about the relative positions between the irradiated spot $\alpha$ and the detection zone $\beta$, if the position of the detection surface 10 is changed from the short separation as shown in FIGS. 3 and 4 to the long separation as shown in FIGS. 5 and 6, the irradiated spot $\beta$ is moved from the position of the relatively low illuminance as shown in FIG. 4 to the position of the relatively high illuminance as shown in FIG. 6. As the detection surface 10 is separated farther, the detection zone $\beta$ is moved to the positions of relatively higher illuminances, and therefore, the amount of light reaching the light receiving element 3 is kept to low variations. The size of the detection zone $\beta$ which represents the limit of the variation of the delivered light is accompanied by smaller numerical apertures N.A. for the light receiving side lens 8 compared with the numerical apertures for the light emitting side lens 7, and therefore, if the position of the detection surface 10 is changed from the position of the shortly separated reading spot X as shown in FIG. 3 and 4 to the position of a more widely separated distance W, then the dispersing rate of the detection zone $\beta$ relative to the dispersion rate of the irradiated spot $\alpha$ becomes lower, resulting in that the lowering of the resolving power can be prevented, and in combination with the inhibition of the variation of the illuminance, the focal depth becomes deeper.

Figure 9A:
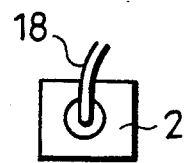
FIGS. 9A, 9B and 9C illustrate the shapes of the irradiated spots.
Figure 9B:
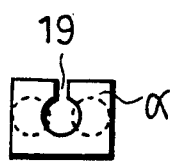
Figure 9C:
Figure 10:
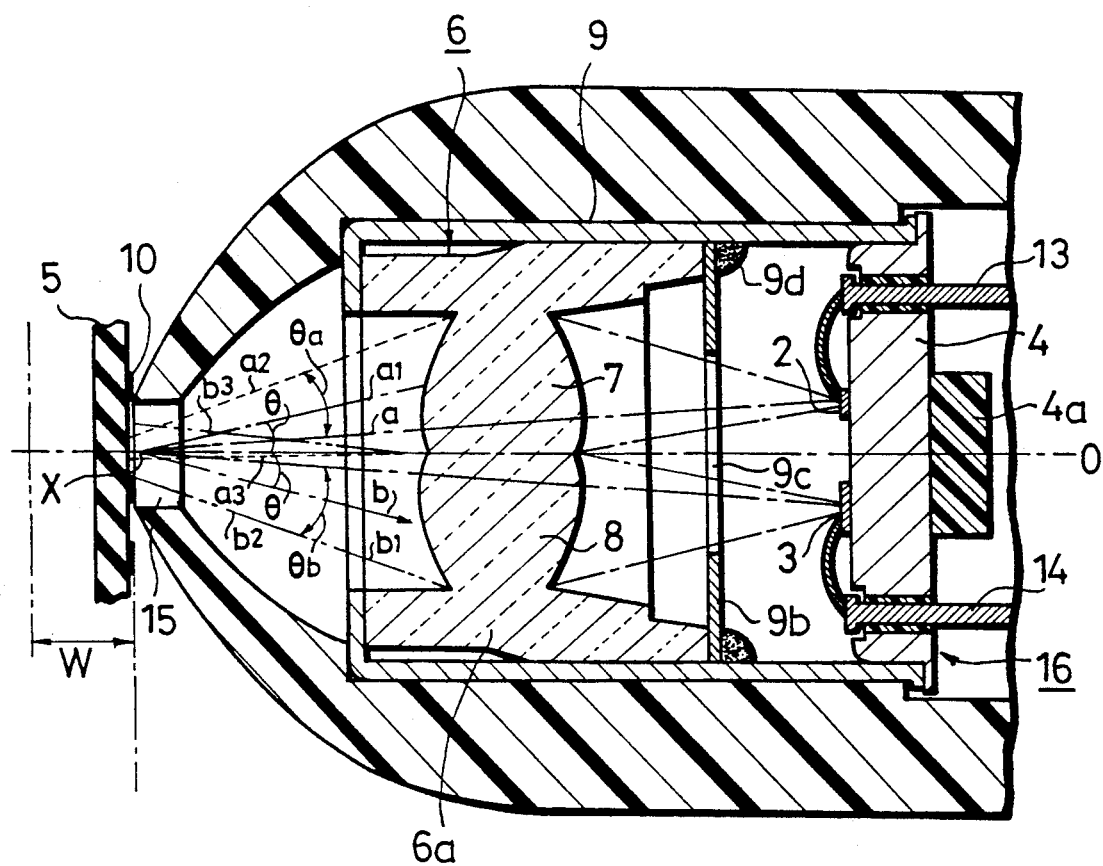
FIGS. 10 to 19 illustrate a conventional optical reading device.
Figure 11:
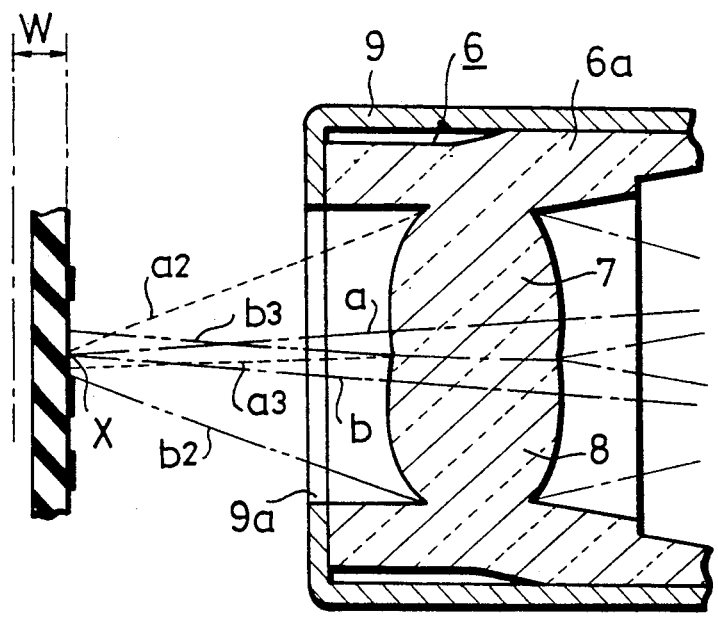
Figure 12:
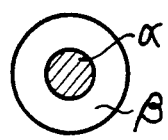
Figure 13:
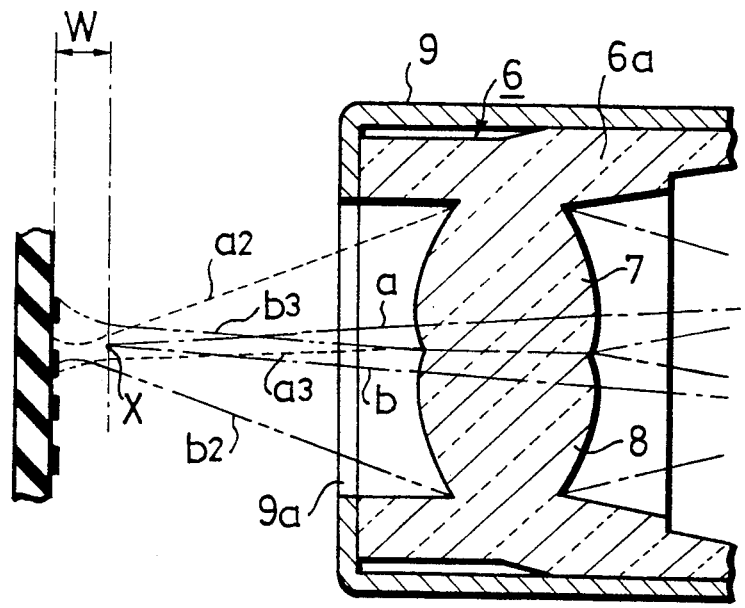
Figure 14:
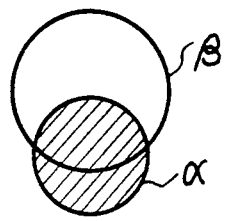
Figure 15:
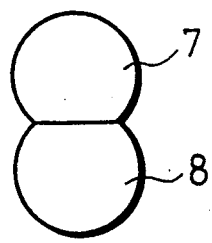
Figure 16A:
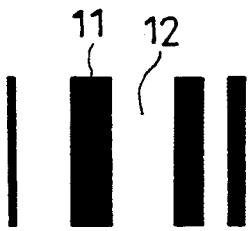
Figure 16B:
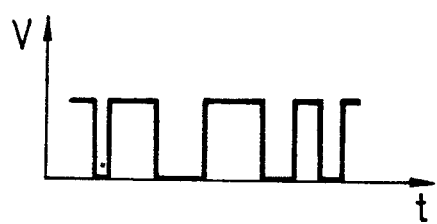
Figure 17:
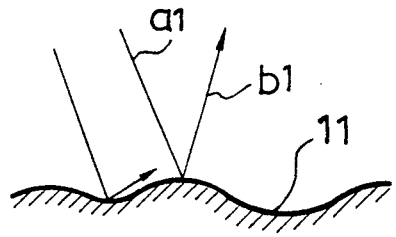
Figure 18:
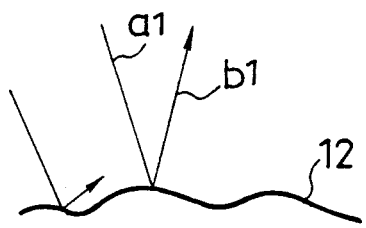
Figure 19:
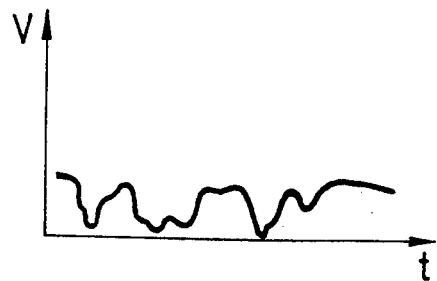

A conductive light-shielding conductor 18 is wire-bonded between the light emitting element 2 and the terminal 13 as shown in FIG. 1 and 9A, and therefore, in the case where light from the light emitting element 2 is focussed onto the detection surface 10 through the light emitting side lens 7 having no spherical and comatic aberrations, a low illuminance shaded portion 19 appears corresponding to the light-shielding contour due to the wire-bonding influencing to a part of the irradiated spot $\alpha$ as shown in FIG. 9B, resulting in that the overlapping of the shaded portion 19 with the detection zone β is varied due to the variation of the separation of the medium 5, thereby bringing the undesirable effect of unstable reading function. But in the embodiment of the present invention, a spherical or comatic aberration is supposed to appear in the light emitting side lens, and therefore, as shown in FIG. 9C, the irradiated spot α is improved because the shaded portion 19 becomes narrow. At the same time, the illuminating distribution within the irradiating spot α is restricted to low variations, and therefore, the variation of the light amount delivered to the light receiving element 3 due to the variations of the overlapping of the detection zone β is reduced to an extremely low level, thereby making it possible to carry out stable readings.

Further, in the embodiment of the present invention, the light receiving side lens 8 which is made to have a reduced spherical aberration by a non-spherical correction improves the resolving power in correspondence with the size of the detection zone B. Further, owing to the diaphragm which is made of a light-shielding material and has a light-passing hole of a desirable shape, and which is disposed between the light receiving side lens 8 and the light receiving element 3, further improvements of the resolving power is made possible. The said diaphragm is opposingly disposed on the optical axis of the light receiving side lens 8 of the light receiving element 3 which has a larger receiving area compared with the light emitting area of the light emitting element 2, and this ultimately corrects the actual comatic aberrations, thereby further improving the resolving power.

Figure 7:
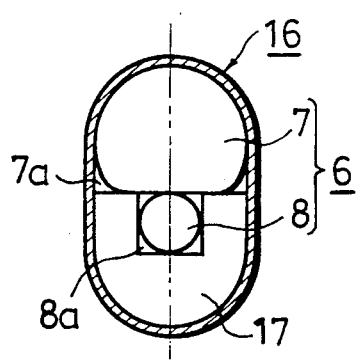
FIG. 7 is a sectional plan view of the lens 6 of FIG. 1.

In order to improve the assemblability and the quality stability of the lens 6 and the supporter 17 described above, the two spaces 7a formed between the lens 7, the supporter 17 and the tubular body 9, and the four spaces 8a formed between the lens 8, the lens 7 and the supporter 17 as shown in FIG. 7 can be removed by making the lenses 7, 8 extend to the said spaces with the same material, thereby blocking and through spaces between the light emitting and light receiving elements 2, 3 in order to form a dust proof structure. In this case, the filled spaces 7a, 8a should be added with light-shielding members in order to block the leaking light through the filled spaces 7a, 8a. Further, in the same manner as that of the conventional structure, the lens 6 and the supporter 17 can be formed in an integral body to bring the same effect.

Figure 2:
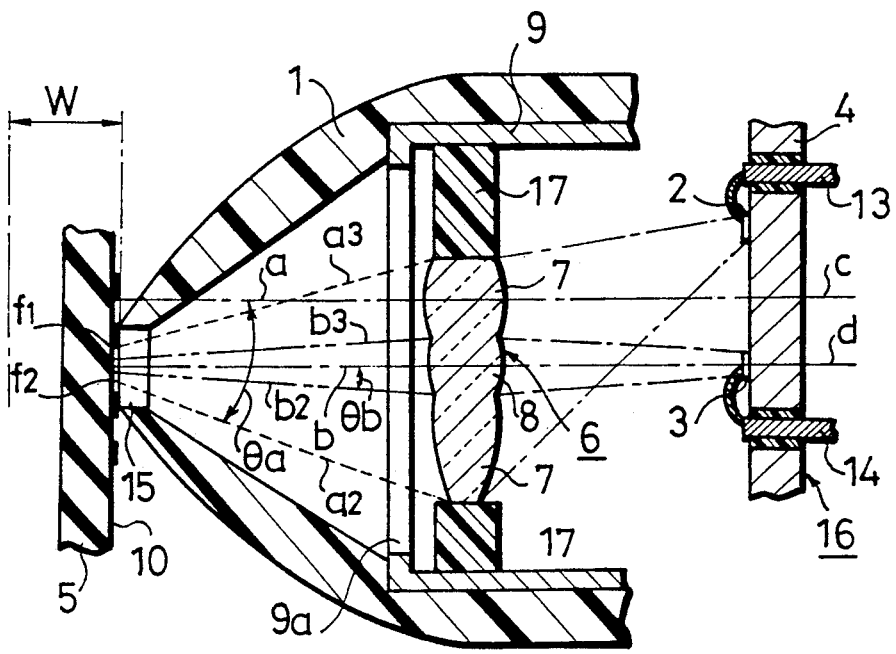
FIG. 2 is a sectional view showing the critical portion of the second embodiment of the optical reading device according to the present invention.
Figure 8:
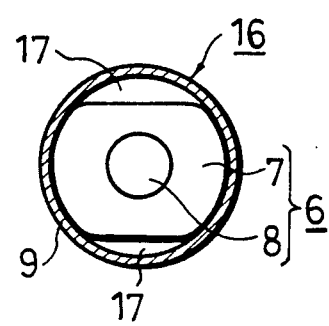
FIG. 8 is a sectional plan view of the lens 6 of FIG. 2.

Now the second embodiment of the present invention will be described referring to FIGS. 2 and 8. The parts which are same or have the same functions as those of the conventional device or the first embodiment of the present invention will be skipped without adding repeated descriptions.

The constitution of the second embodiment is such that the tubular body 9 having a reflective photo sensor 16 has a cylindrical contour, and a lens 6 and a supporter 17 are press-fitted into the cylindrical body 9. The lens 6 consists of a light emitting side lens 7 and a light receiving side lens 8 which are formed in an integral body each other, and in which the optical axis a of the light emitting side lens 7 and the optical axis b of the light receiving side lens 8 are parallelly directed. The light emitting side lens 7 having a larger area and the light receiving side lens 8 having a different curvature are approximately concentricially installed within the cylindrical body 9. The integrally formed lens 6 is cut off by larger amount at the side where the light emitting element 2 is disposed, and cut off by smaller amount at the side (the opposite side) where the light receiving element 3 is disposed, the remaining portion of the circumference of the lens 6 being fitted onto the inner circumference of the cylindrical body 9. The two spaces corresponding to the cut-off portion formed between the lens 6 and the cylindrical body 9 are press-fitted with supporters 17 made of a light-shielding material in order to seal off against the intruding of dust to the light emitting and light receiving elements 2, 3.

The lens 6 which consists of the light emitting side lens 7 and the light receiving side lens 8, the latter being formed within the former, requires a relatively simple kind of die for its formation, and is also relatively simple in handling. Further, the optical axis b of the light receiving side lens 8 can be easily disposed at a nearby position relative to the axes of the case 1, the tubular body 9 and the aperture 15, and this feature is helpful for miniaturizing the optical reading device. Other functions and effect of this second embodiment are same as those of the first embodiment of the present invention which was described above referring to FIGS. 1, 3 to 7, and 9. Further, it is also possible in this second embodiment that the supporter 17 is integrally formed with the lens 6 as described above.

In the optical reading devices described above, the description was made based on the assumption that the bar codes which are optically marked are read. But the device of the present invention is not limited to this, but is applicable even to an image scanner, paper edge sensor, optical reflective position sensor for detecting the reflected amount of the light.

In the device of the present invention as described above, the optical axes a, b of the light emitting side and light receiving side lenses 7, 8 are parallelly disposed, a comatic aberration is provided between the light emitting side lens 7 and the light emitting element 2, and smaller numerical apertures N.A. are provided to the light receiving side lens 8 compared with the light emitting side lens 7, so that, even if there is a variation of distance of the detection surface 10 or a variation in the illuminance distribution of the irradiated spot (together with the detection zone β), the amount of light reaching the light receiving element is kept stable. Further, the proportion of the forwardly reflected light is small, and therefore, reading errors will not occur even when the detection surface 10 is varied in its distance and angle, at the same time, deepening the focal depth, and making it possible to expand the setting range for the resolving power, thereby providing a practically useful optical reading device.

What is claimed is:

1. An optical reading device for reading marks on a medium within a region, comprising:
    a light emitting element for illuminating a spot on the medium;
    a light receiving element for detecting light reflected substantially exclusively by a portion of the medium within the spot, the portion being spaced from a boundary of the spot;
    a first lens for focusing light from said light emitting element onto said region forming said spot, said first lens having a first optical axis spaced from said light emitting element, said first lens having comatic aberration; and
    a second lens for focusing light from the portion of the spot within said region onto said light receiving element, wherein said second lens is disposed inside said first lens.

2. An optical reading device for reading marks on a medium within a region, comprising:
- a light emitting element for illuminating a spot on the medium;
- a light receiving element for detecting light reflected substantially exclusively by a portion of the medium within the spot, the portion being spaced from a boundary of the spot;
- a first lens for focusing light from said light emitting element onto said region forming said spot, said first lens having a first optical axis spaced from said light emitting element; and
- a second lens for focusing light from the portion of the spot within said region onto said light receiving element,
- wherein said second lens is disposed inside said first lens.

3. An optical reading device for reading marks on a medium within a region, comprising:
- a light emitting element for illuminating a spot on the medium;
- a light receiving element for detecting light reflected by a portion of the medium within the spot;
- a first lens for focusing light from said light emitting element onto said region forming said spot; and
- a second lens for focusing light from the portion of the spot within said region onto said light receiving element,
- wherein said second lens is disposed inside said first lens.

* * * * *